United States Patent
Diederiks et al.

[11] Patent Number: 5,916,698
[45] Date of Patent: Jun. 29, 1999

[54] APPARATUS COMPRISING AN ELECTRICAL DEVICE AND A BATTERY HOLDER

[75] Inventors: Elmo M. A. Diederiks, Maastricht; Stefan G. Kruijswijk, Eindhoven, both of Netherlands

[73] Assignee: U.S. Philips Corporation, New York, N.Y.

[21] Appl. No.: 08/863,988

[22] Filed: May 28, 1997

[30] Foreign Application Priority Data

May 31, 1996 [EP] European Pat. Off. .............. 96201520

[51] Int. Cl.⁶ ..................................................... H01M 2/10
[52] U.S. Cl. ................................. 429/1; 429/97; 327/581; 381/323
[58] Field of Search ................................... 429/1, 97, 98, 429/100; 381/323; 327/581

[56] References Cited

U.S. PATENT DOCUMENTS

| | | | |
|---|---|---|---|
| 3,062,911 | 11/1962 | Joy | 429/98 |
| 5,089,728 | 2/1992 | Nguyen | 327/581 X |
| 5,378,549 | 1/1995 | Eylon | 429/1 |
| 5,541,495 | 7/1996 | Gali | 429/1 X |

FOREIGN PATENT DOCUMENTS 9010347  11/1990  Germany .

*Primary Examiner*—Stephen Kalafut
*Attorney, Agent, or Firm*—Daniel E. Tierney

[57] ABSTRACT

An apparatus comprising an electrical device having a first connection terminal, a second connection terminal and a holder for holding a voltage source having two voltage-source terminals. The holder has a first contact, a second contact and a third contact for cooperation with the voltage-source terminals. Via these contacts the first connection terminal is connectable to one voltage-source terminal and the second connection terminal is connectable to the other voltage-source terminal. The holder is adapted to allow the first contact, the second contact and the third contact to engage simultaneously with the voltage-source terminals. When the voltage source is present the first contact and one of the two other contacts are in engagement with one of the voltage-source terminals, and the other contact, which is not in engagement with the first voltage-source terminal, is in engagement with the second voltage-source terminal. The first contact is connected to the first connection terminal of the electrical device and the second contact and the third contact are connected to, respectively, a first input and a second input of a FET circuit. The FET circuit has an output connected to the second connection terminal of the electrical device.

9 Claims, 3 Drawing Sheets

APPARATUS COMPRISING AN ELECTRICAL DEVICE AND A BATTERY HOLDER

BACKGROUND OF THE INVENTION

The invention relates to an apparatus comprising an electrical device having a first connection terminal and a second connection terminal and further comprising a holder for holding a voltage source having a first voltage-source terminal and a second voltage-source terminal, which holder has a first contact, a second contact and a third contact for cooperation with the voltage-source terminals, via which contacts the first connection terminal is connectable to the first voltage-source terminal and the second connection terminal is connectable to the second voltage-source terminal.

Such an apparatus is known as a hearing aid from DE-U 90 10 347. The known apparatus comprises a battery holder adapted to hold a battery, particularly a button-type battery. The holder has three contact springs, i.e. one central contact spring and two end contact springs disposed adjacent the latter. The central contact spring is electrically connected to electrical components of the hearing aid, such as a microphone, an amplifier, a loudspeaker and the like. Both end contact springs are electrically interconnected and are jointly electrically connected to said electrical components. The battery holder has a special positioning construction in the battery compartment in order to ensure that after it has been placed into the battery compartment a button-type battery is exclusively in contact with the central contact spring and one of the end contact springs, the central contact spring being in contact with one battery terminal and the relevant end contact spring with the other battery terminal.

Although the known apparatus provides a solution in order to prevent a battery from being placed the wrong way around into a battery holder of a hearing aid, the known apparatus has some drawbacks. One of the drawbacks is that the adopted solution imposes stringent mechanical requirements on the holder, particularly as regards the permissible tolerances of the positioning construction which is used. The precision of this construction should be very high in order to guarantee reliable contact-making even after frequent battery replacement. Another drawback is that the interconnected end contact springs may simultaneously come into contact with the battery terminals during or after placement of the battery and thus cause a short-circuit.

SUMMARY OF THE INVENTION

It is an object of the invention to improve the apparatus of the type defined in the opening paragraph, so as to preclude the drawbacks of the known apparatus.

To this end, the apparatus in accordance with the invention is characterized in that the holder is adapted to allow the first contact, the second contact and the third contact to engage simultaneously with the voltage-source terminals, the second contact or the third contact being in engagement with the second voltage-source terminal when the voltage source is present, the second or the third contact, whichever is not in engagement with the second voltage-source terminal, and the first contact being in engagement with the first voltage-source terminal, the first contact being connected to the first connection terminal of the electrical device and the second contact and the third contact being connected to, respectively, a first input and a second input of a FET circuit, which circuit has an output connected to the second connection terminal of the electrical device.

Although the apparatus in accordance with the invention can be used in miscellaneous devices, such as watches, calculators and the like, which use replaceable batteries, the apparatus is particularly suitable for applications in which batteries, particularly small batteries, are to be replaced frequently, as in hearing aids. Hearing aids are often used by elderly persons, by whom the replacement of batteries, certainly in the case of button-type batteries, is considered to be inconvenient. Moreover, such batteries are so small that even a slight manipulation of a battery in the battery holder is awkward. In the apparatus in accordance with the invention the battery holder has three contacts, which come all into contact with the battery during placement and remain in contact with the battery after placement. To place a battery a user can therefore simply press or slide the battery into the holder without having to worry about a possibly wrong position of the battery and/or a possible short-circuit as a result of awkward maneuvering with the battery. Indeed, when a battery is present in the holder the second contact or the third contact is always in contact with the second terminal and the second or third contact, whichever is not in contact with the second terminal, and the first contact are always in contact with the first terminal of the battery. The circuit present in the apparatus automatically assures the correct contact selection.

An embodiment of the apparatus in accordance with the invention is characterized in that the FET circuit comprises a first FET and a second FET, each having an input electrode, an output electrode, and a control electrode, said circuit having its first input connected to the input electrode of the first FET and to the control electrode of the second FET, said circuit having its second input connected to the input electrode of the second FET and to the control electrode of the first FET, and both FETs having their output electrodes connected to the output of said circuit. When the battery is present the FETs thus arranged ensure that the contact which engages with the second terminal of the battery is automatically connected to the electrical device. In a practical embodiment the first terminal is the + terminal of the battery and the second terminal is the − terminal of the battery. The first contact, which engages with the first terminal of the battery, can be connected to the electrical device without any additional provisions. The remaining contact, which also engages with the first terminal, is disabled by the use of the simple circuit arrangement.

An embodiment of the apparatus in accordance with the invention is characterized in that at least one of said FETs is a MOSFET.

The current consumption can be extremely low, for example less than 1 $\mu$A.

When a MOSFET is used the impedance can be low, for example 4$\Omega$. Preferably, low-threshold MOSFET components are used.

An embodiment of the apparatus in accordance with the invention is characterized in that the input electrode is a drain, the output electrode is a source, and the control electrode is a gate. The FETs or MOSFETs used can be normal commercially available components.

An embodiment of the apparatus in accordance with the invention is characterized in that at least one of the contacts of the holder is a contact spring. In this embodiment it is assured in a practical and simple manner that proper connections between the contacts of the holder and the terminals of the battery are obtained.

An embodiment of the apparatus in accordance with the invention is characterized in that the holder is adapted to hold a cylindrical voltage source whose first voltage-source terminal is formed by a first end face and a circumferential surface and whose second voltage-source terminal is formed by a second end face, the first contact being interposed between the second and the third contact. In this practical embodiment the battery can be placed simply yet reliably in a space bounded by the contacts.

An embodiment of the apparatus in accordance with the invention is characterized in that the holder is adapted to hold a voltage source of the button-cell type. This embodiment is particularly suitable for uses where only a very small space is available for a voltage source, such as in a hearing aid.

The invention further relates to a hearing aid including an apparatus in accordance with the invention, the electrical device comprising at least one electrical element or component of the hearing aid. In the case of the hearing aid in accordance with the invention a user has the advantage that the voltage source required for the operation of the hearing aid can easily be placed into and removed from the hearing aid. Owing to the automatic selection circuit comprising few components and owing to the simple construction of the battery holder the apparatus itself can have minimal dimensions when a button-type battery is used and is therefore suitable for very small hearing instruments, such as behind-the-ear apparatus or in-the-ear apparatus.

An embodiment of the hearing aid in accordance with the invention is characterized in that the holder accommodates a button-type battery having two battery terminals, the first contact being a central contact disposed between the second contact and the third contact, and the second contact and the third contact being end contacts, the center contact and one of the end contacts being in engagement with one battery terminal and the other end contact being in engagement with the other battery terminal of the button-type battery. In this embodiment minimal dimensions of the hearing aid are attainable, while its reliability and ease of use are guaranteed.

The invention further relates to a FET circuit suitable for use in an apparatus or hearing aid in accordance with the invention and having the characteristic features as claimed in claim 2, 3 or 4.

BRIEF DESCRIPTION OF THE DRAWINGS

The invention will now be described in more detail, by way of example, with reference to the drawings, in which.

DETAILED DESCRIPTION

Figure 1:
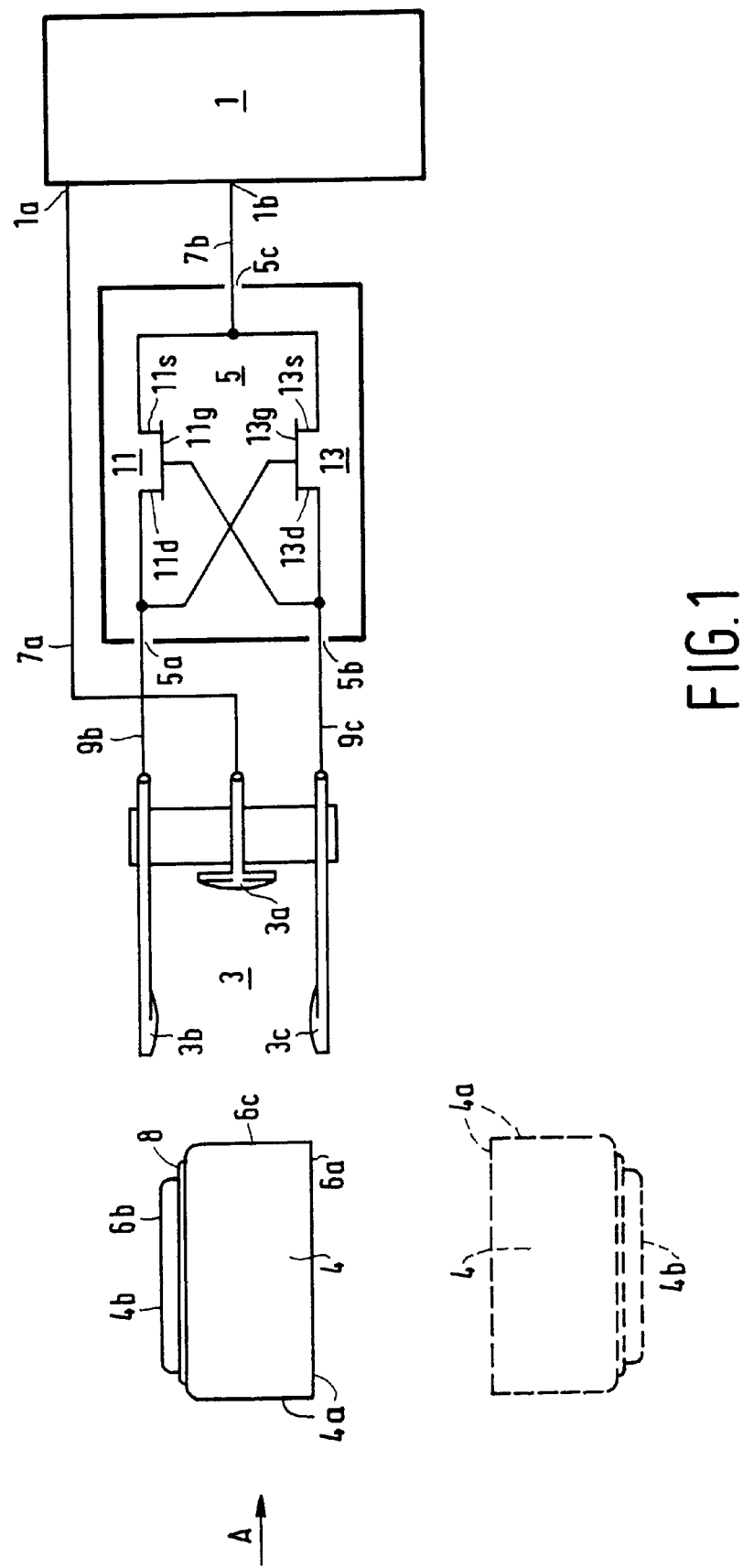
FIG. 1 shows diagrammatically an embodiment of the apparatus in accordance with the invention.
Figure 2:
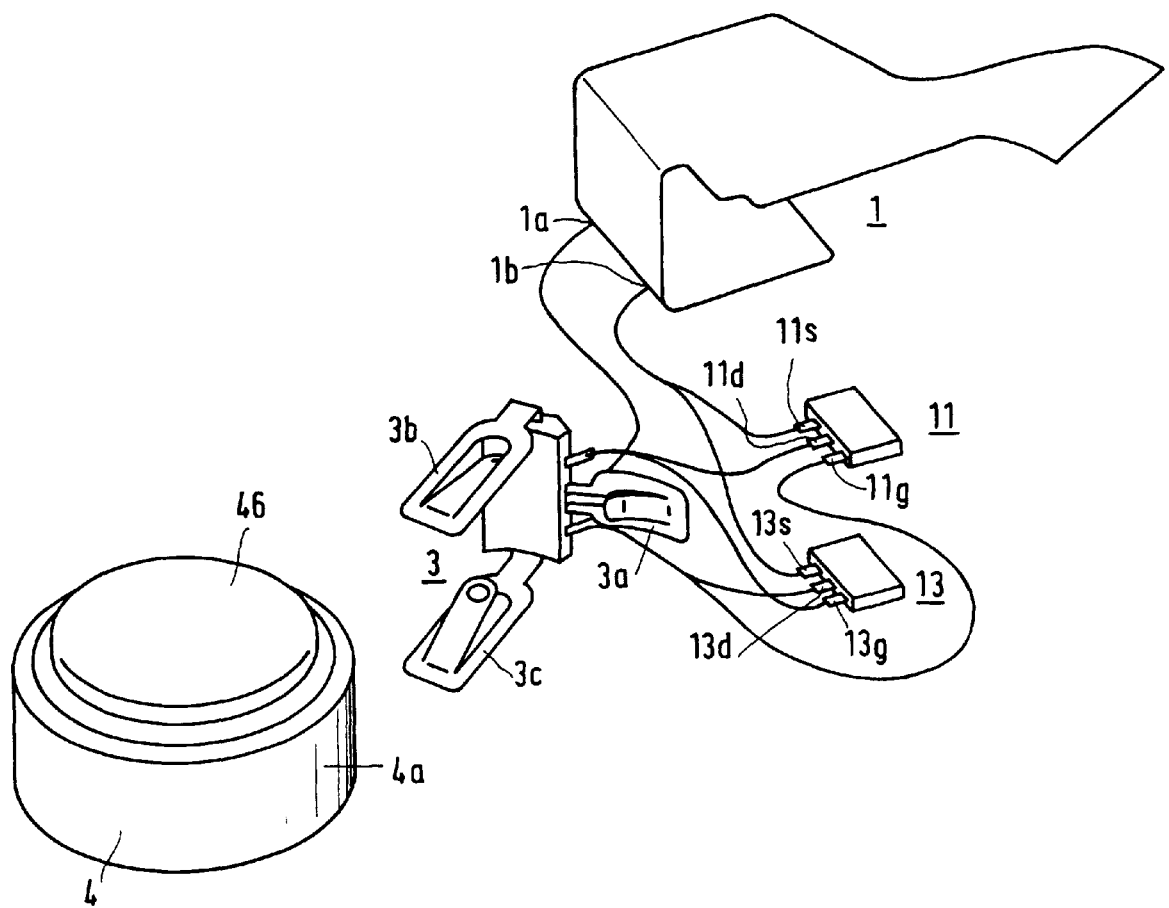
FIG. 2 is a perspective view of the embodiment shown in FIG. 1.

The apparatus in accordance with the invention shown in FIGS. 1 and 2 comprises an electrical device 1, a holder 3 adapted to hold a voltage source 4, and a FET circuit 5. The electrical device, such as a miniature radio receiver, comprises two connection terminals, i.e. a first connection terminal 1a and a second connection terminal 1b. The holder 3 has three contacts, i.e. a first contact 3a, a second contact 3b and a third contact 3c, the first contact 3a being the central contact and the second and the this contact being constructed as leaf-spring-type resilient end contacts. The voltage source 4 takes the form of a disc-shaped or cylindrical button-type battery, which as is known per se, comprises a first battery terminal 4a, viz. a + terminal, and a second battery terminal 4b, viz. a − terminal. The second battery terminal 4b is formed by an end face 6b of the battery 4 and the first battery terminal 4a is formed by and end face 6a and a circumferential surface 6c of the battery 4. An insulating layer 8 has been provided between the two battery terminals 4a and 4b. The contacts 3a, 3b and 3c have such shapes and are so positioned relative to one another that after the battery 4 has been placed into the holder 3, in the present example by a movement as indicated by the arrow A shown in FIG. 1, all the contacts engage with a terminal of the battery 4, the first contact 3a and the third contact 3c being in engagement with the first battery terminal 4a and the second contact 3b being in engagement with the second battery terminal 4b of the battery 4. For the sake of completeness, the battery 4 in FIG. 1 has been shown in broken lines in an alternative position relative to the holder 3. After the battery 4 has been placed into the holder 3 from the broken-line position, the first contact 3a and the second contact 3b are in engagement with the first battery terminal 4a and the third contact 3c is in engagement with the second battery terminal 4b.

The first contact 3a of the holder 3 is electrically connected to the first connection terminal 1a of the device 1 via an electrical conductor 7a. The second and the third contact 3b and 3c are electrically connected to, respectively, a first input 5a and a second input 5b of the FET circuit 5 via respective electrical conductors 9b and 9c. The circuit 5 has an output 5c, which is electrically connected to the device 1 via an electrical conductor 7b.

The FET circuit 5 comprises two FETs, i.e. a first FET 11 and a second FET 13, particularly MOSFETs, in the present example of the N-channel type. The FET 11 has a drain 11d, a source 11s and a gate 11g and the FET 13 has a drain 13d, a source 13s and a gate 13g. The first input 5a is electrically connected to the drain 11d of the first FET 11 and the gate 13g of the second FET 13, while the second input 5b is electrically connected to the drain 13d of the second FET 13 and the gate 11g of the first FET 11. The sources 11s and 13s are both electrically connected to the output 5c. The circuit 5 ensures that the electrical device 1 is automatically connected to the + terminal and the − terminal of the battery 4 in the correct manner, whichever of the two positions shown is occupied by the battery 4 in the holder 3.

Figure 3:
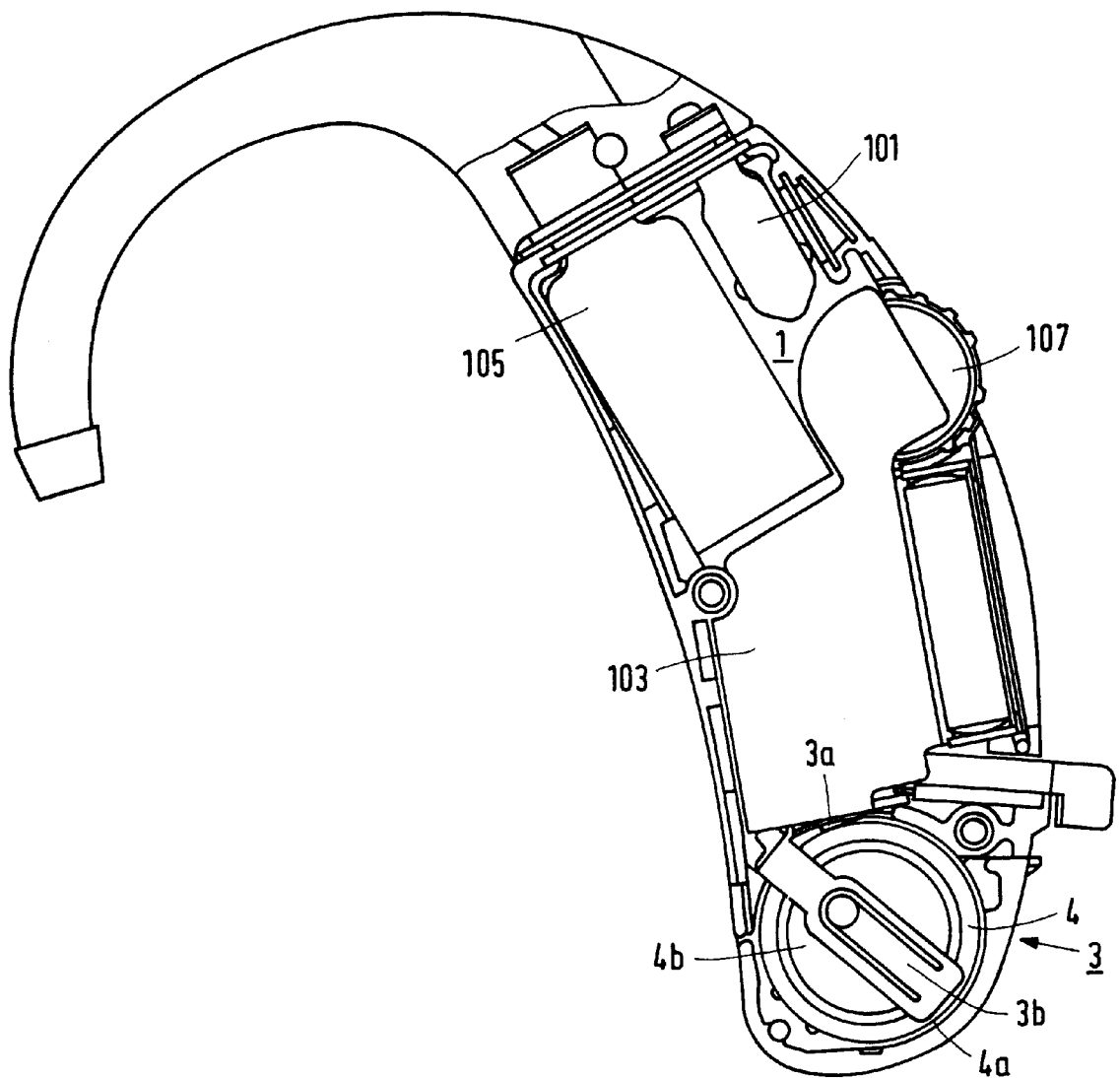
FIG. 3 is a diagrammatic side view showing an embodiment of the hearing aid in accordance with the invention.

The hearing aid in accordance with the invention shown in FIG. 3 includes the apparatus shown in FIGS. 1 and 2. The hearing aid, in the present example a behind-the-ear hearing aid, comprises an electrical device 1, which comprises inter alia a microphone 101, an amplifier 103 and a loudspeaker 105. The volume of sound can be adjusted by means of a volume control 107. FIG. 3 partly shows the holder 3 of the apparatus, particularly the first contact 3a and the second contact 3b. The holder accommodates a button-type battery 4, the first contact 3a, which is a central contact, and the third contact 3c, which is not shown and which is an end contact, being in engagement with the + terminal 4a of the battery and the second contact 3b, which is an end contact, being in engagement with the − terminal 4b of the battery. In the present example the button-type battery is a 1.2 V battery. Owing to its mechanical and electronic simplicity the apparatus in accordance with the invention shown in FIGS. 1 and 2 is particularly suitable for use in hearing instruments. The apparatus requires only little space, is user-friendly and can be manufactured simply and, in addition, its current consumption is low and the supply-line impedance can be low.

It is to be noted that the invention is not limited to the embodiment disclosed herein. For example, the hearing aid in accordance with the invention can be an in-the-ear hearing aid instead of a behind-the-ear hearing aid.

We claim:

1. An apparatus comprising an electrical device having a first connection terminal and a second connection terminal and further comprising a holder for holding a voltage source having a first voltage-source terminal and a second voltage-source terminal, which holder has a first contact, a second contact and a third contact for cooperation with the voltage-source terminals, via which contacts the first connection terminal is connectable to the first voltage-source terminal and the second connection terminal is connectable to the second voltage-source terminal, characterized in that the holder is adapted to allow the first contact, the second contact and the third contact to engage simultaneously with the voltage-source terminals, the second contact or the third contact being in engagement with the second voltage-source terminal when the voltage source is present, the second or the third contact, whichever is not in engagement with the second voltage-source terminal, and the first contact being in engagement with the first voltage-source terminal, the first contact being connected to the first connection terminal of the electrical device and the second contact and the third contact being connected to, respectively, a first input and a second input of a FET circuit, which circuit has an output connected to the second connection terminal of the electrical device.

2. An apparatus as claimed in claim 1, characterized in that the FET circuit comprises a first FET and a second FET, each having an input electrode, an output electrode, and a control electrode, said circuit having its first input connected to the input electrode of the first FET and to the control electrode of the second FET, said circuit having its second input connected to the input electrode of the second FET and to the control electrode of the first FET, and both FETs having their output electrodes connected to the output of said circuit.

3. An apparatus as claimed in claim 2, characterized in that at least one of said FETs is a MOSFET.

4. An apparatus as claimed in claim 2, characterized in that, for the first FET, the input electrode is a drain, the output electrode is a source, and the control electrode is a gate, and that, for the second FET, the input electrode is a drain, the output electrode is a source, and the control electrode is a gate.

5. An apparatus as claimed in claim 1, characterized in that at least one of the contacts of the holder is a contact spring.

6. An apparatus as claimed in claim 1, characterized in that the holder is adapted to hold a cylindrical voltage source whose first voltage-source terminal is formed by a first end face and a circumferential surface and whose second voltage-source terminal is formed by a second end face, the first contact being interposed between the second and the third contact.

7. An apparatus as claimed in claim 6, characterized in that the holder is adapted to hold a voltage source of the button-cell type.

8. A hearing aid including an apparatus as claimed in claim 1, the electrical device comprising at least one electrical element of the hearing aid.

9. A hearing aid as claimed in claim 8, the holder accommodating a button-type battery having two battery terminals, the first contact being a central contact disposed between the second contact and the third contact, and the second contact and the third contact being end contacts, the center contact and one of the end contacts being in engagement with one battery terminal and the other end contact being in engagement with the other battery terminal of the button-type battery.

\* \* \* \* \*